United States Patent
Yamazaki

(10) Patent No.: US 11,426,652 B2
(45) Date of Patent: Aug. 30, 2022

(54) GAME CONTROL DEVICE, GAME SYSTEM, AND PROGRAM

(71) Applicant: KONAMI DIGITAL ENTERTAINMENT CO., LTD., Tokyo (JP)

(72) Inventor: Yukihiro Yamazaki, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 462 days.

(21) Appl. No.: 16/434,181

(22) Filed: Jun. 7, 2019

(65) Prior Publication Data

US 2019/0282893 A1    Sep. 19, 2019

Related U.S. Application Data

(63) Continuation of application No. PCT/JP2017/043981, filed on Dec. 7, 2017.

(30) Foreign Application Priority Data

Dec. 12, 2016   (JP) .............................. JP2016-240608

(51) Int. Cl.
*A63F 13/25*        (2014.01)
*G09G 5/36*         (2006.01)
(Continued)

(52) U.S. Cl.
CPC .......... *A63F 13/25* (2014.09); *A63F 13/2145* (2014.09); *A63F 13/52* (2014.09);
(Continued)

(58) Field of Classification Search
CPC . A63F 13/25; G09G 5/363; G09G 2340/0435
(Continued)

(56) References Cited

U.S. PATENT DOCUMENTS

2009/0006875 A1* 1/2009 Varma .................... G06F 1/3203
                                                                713/320
2011/0109624 A1* 5/2011 Greenberg ............ G06F 1/3265
                                                                345/419
(Continued)

FOREIGN PATENT DOCUMENTS

JP     2003157129 A    5/2003
JP        4372103 B2   9/2009
JP     2015229086 A   12/2015

OTHER PUBLICATIONS

On Oct. 4, 1.Optimizing power consumption of mobile games,HotPower'15 Proceedings of the Workshop on Power, p. 21 25, [search on Nov. 29, 2019], Internet <URL:https://dl.acm.org/citation.cfm?id=2818746 #>, the Internet <> Aware Computing and Systems,2015.

(Continued)

*Primary Examiner* — Jay Trent Liddle
*Assistant Examiner* — Ryan Hsu
(74) *Attorney, Agent, or Firm* — HEA Law PLLC

(57)          ABSTRACT

A basic value setting unit (101) sets the basic value of the frame rate of a game screen, based on a setting operation by a user. A determination unit (110) determines as to the presence or absence of an operation relative to an operating unit while a game is being executed. A frame rate changing unit (120) changes the frame rate of the game screen, based on the result of determination by the determination unit (110), while the game is being executed. A frame rate changing unit (120) sets the frame rate to a value lower than the basic value when no operation relative to the operating unit (14) is performed while the game is being executed.

9 Claims, 11 Drawing Sheets

| OPTIONS | FRAME RATE SETTING | |
|---|---|---|
| 1 | FIXED | FIX TO 20 FPS |
| 2 | VARIABLE<br>BASIC: 20fps<br>MAXIMUM: 30fps | NORMALLY SET TO 20 fpsa<br>INCREASE TO 30 fps IN RESPONSE TO OPERATION,<br>AND RETURN TO 20 fps OVER TWO SECONDS |
| 3 | VARIABLE<br>BASIC: 30fps<br>MINIMUM: 20fps | NORMALLY SET TO 30 fpsa<br>DECREASE TO 20 fps WITH NO OPERATION FOR THIRTY SECONDS, AND RETURN TO 30 fps IN RESPONSE TO OPERATION |
| 4 | VARIABLE<br>BASIC: 30fps<br>MINIMUM: 20fps<br>MAXIMUM: 60fps | NORMALLY SET TO 30 fpsa<br>DECREASE TO 20 fps WITH NO OPERATION FOR TEN SECONDS<br>INCREASE TO 60 fps IN RESPONSE TO OPERATION,<br>AND RETURN TO 30 fps OVER ONE SECOND |
| 5 | FIXED | FIX TO MAXIMUM FRAME RATE OF GAME TERMINAL |

(51) Int. Cl.
  *G09G 3/20* (2006.01)
  *G09G 5/00* (2006.01)
  *A63F 13/77* (2014.01)
  *H04N 7/01* (2006.01)
  *A63F 13/2145* (2014.01)
  *A63F 13/52* (2014.01)

(52) U.S. Cl.
  CPC .............. *A63F 13/77* (2014.09); *G09G 3/20* (2013.01); *G09G 5/00* (2013.01); *G09G 5/363* (2013.01); *H04N 7/01* (2013.01); *G09G 2340/0435* (2013.01)

(58) Field of Classification Search
  USPC ......................................................... 463/31
  See application file for complete search history.

(56) References Cited

U.S. PATENT DOCUMENTS

2016/0224092 A1\* 8/2016 Weitzman ............. G06F 1/3265
2017/0031430 A1\* 2/2017 Ansorregui ........... G06F 1/3206
2017/0371394 A1\* 12/2017 Chan ..................... G06F 1/3218

OTHER PUBLICATIONS

A time in which a FPS restriction setting is requested, Jul. 30, Jul. 29, 2019, Internet <URL:http://forum.square-enix.com/ffxiv/threads/183893>, Internet <Final Fantasy XIV Forum[online],2014 /> (For Concise Explanation of Relevance, see computer generated English translation of the Office Action for corresponding JP Patent Application No. 2018-017968).

Computer generated English translation of the Office Action dated Dec. 10, 2019, for corresponding JP Patent Application No. 2018-017968.

International Search Report for PCT/JP2017/043981 dated Mar. 13, 2018 with its translation.

Form PCT/ISA/237 with PCT/IB338 and PCT/IB373 of PCT/JP2017/043981.

Office Action dated Aug. 22, 2019, for corresponding JP Application No. 2016-240608 with its translation.

\* cited by examiner

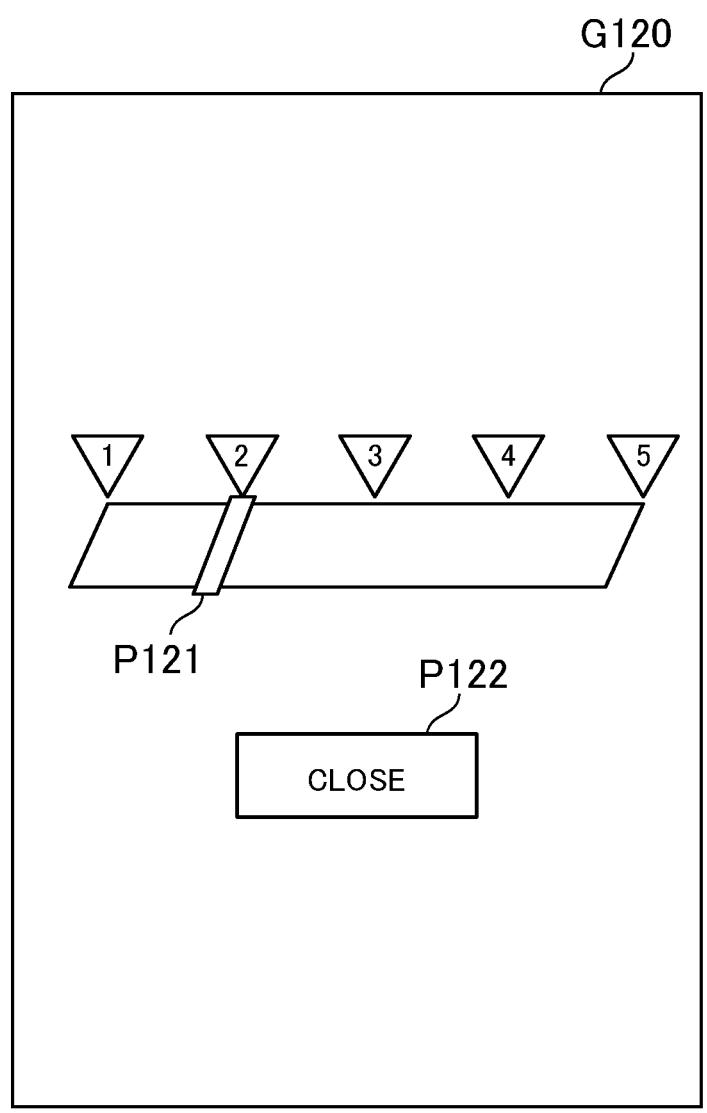

FIG.6

| OPTIONS | FRAME RATE SETTING | |
|---|---|---|
| 1 | FIXED | FIX TO 20 FPS |
| 2 | VARIABLE<br>BASIC: 20fps<br>MAXIMUM: 30fps | NORMALLY SET TO 20 fpsa<br>INCREASE TO 30 fps IN RESPONSE TO OPERATION, AND RETURN TO 20 fps OVER TWO SECONDS |
| 3 | VARIABLE<br>BASIC: 30fps<br>MINIMUM: 20fps | NORMALLY SET TO 30 fpsa<br>DECREASE TO 20 fps WITH NO OPERATION FOR THIRTY SECONDS, AND RETURN TO 30 fps IN RESPONSE TO OPERATION |
| 4 | VARIABLE<br>BASIC: 30fps<br>MINIMUM: 20fps<br>MAXIMUM: 60fps | NORMALLY SET TO 30 fpsa<br>DECREASE TO 20 fps WITH NO OPERATION FOR TEN SECONDS<br>INCREASE TO 60 fps IN RESPONSE TO OPERATION, AND RETURN TO 30 fps OVER ONE SECOND |
| 5 | FIXED | FIX TO MAXIMUM FRAME RATE OF GAME TERMINAL |

GAME CONTROL DEVICE, GAME SYSTEM, AND PROGRAM

CROSS-REFERENCE TO RELATED APPLICATION

This application is a continuation-in-part of International Application No. PCT/JP2017/043981, filed in the Japan Patent Office on Dec. 7, 2017, the entire contents of which are hereby incorporated by reference. This application claims priority from Japanese application JP 2016-240608 filed on Dec. 12, 2016, the entire contents of which are hereby incorporated by reference.

TECHNICAL FIELD

The present invention relates to a game control device, a game system, and a program.

BACKGROUND ART

In mobile terminals, such as, for example, portable phones (including smart phones) and tablet computers, games may be executed while the mobile terminal is driven by a battery in some cases. In such cases, executing games consumes the battery largely. Thus, reduction in battery consumption is desired. Regarding this point, as the frame rate (the number of frames that are processed for a unit period of time) of a game screen affects power consumption, conventionally, a user is allowed to set the frame rate to a low value to reduce power consumption. For example, JP2015-229086A discloses a technique for allowing a user to freely set the frame rate within a typical range of frame rates from 30 fps to 60 fps for game devices.

SUMMARY OF INVENTION

Technical Problem

In conventional games, however, once the frame rate is set to a low value, the frame rate is fixed to the low value while a game is being executed (while a game is being played), and consequently a screen is updated less frequently. That is, an image displayed on the screen will not smoothly change in response to an operation by a user, which the user may find unsatisfactory in some cases.

The present invention has been conceived in view of the above, and it is an object of the present invention to provide a game control device, a game system, and a computer readable non-transitory information storage medium storing a program capable of reducing power consumption by reducing a frame rate, while assuring smooth change of an image displayed on a screen in response to an operation by a user.

Solution to Problem

In order to achieve the above described objects, a game control device according to one aspect of the present invention includes a basic value setting unit for setting the basic value of the frame rate of a game screen, based on a basic value setting operation by a user; a determination unit for determining as to the presence or absence of an operation relative to an operating unit while a game is being executed; and a frame rate changing unit for changing the frame rate of the game screen, based on the result of determination by the determination unit, while the game is being executed, such that the frame rate is set to a value lower than the basic value when no operation relative to the operating unit is performed while the game is being executed.

A game system according to one aspect of the present invention includes: a basic value setting unit for setting the basic value of the frame rate of a game screen, based on a basic value setting operation by a user; a unit for obtaining the result of determination as to the presence or absence of an operation relative to an operating unit while a game is being executed; and a frame rate changing unit for changing the frame rate of the game screen, based on the result of determination, while the game is being executed, such that the frame rate is set to a value lower than the basic value when no operation relative to the operating unit is performed.

An information processing system or an information processing device according to one aspect of the present invention includes a basic value setting unit for setting the basic value of the frame rate of a screen, based on a basic value setting operation by a user; a unit for obtaining a result of determination as to the presence or absence of an operation relative to an operating unit; and a frame rate changing unit for changing the frame rate of the screen, based on the result of determination, such that the frame rate is set to a value lower than the basic value when no operation relative to the operating unit is performed.

BRIEF DESCRIPTION OF DRAWINGS

FIG. 5 is one example of a setting image.

FIG. 6 explains options 1 to 5.

DESCRIPTION OF EMBODIMENTS

Examples of an embodiment of the present invention will now be described based on the drawings.

1. STRUCTURE OF GAME SYSTEM

Figure 1:
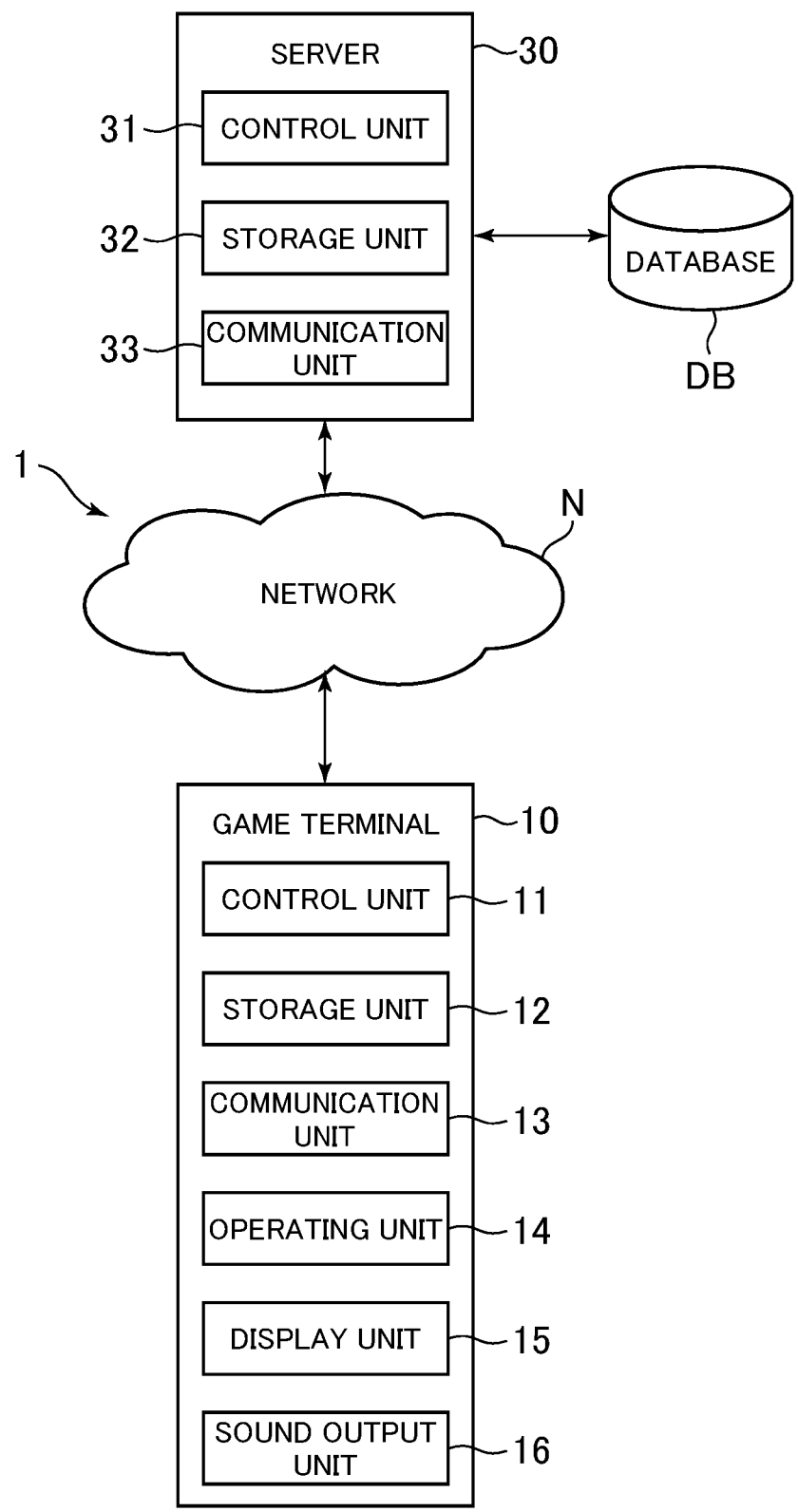
FIG. 1 is a complete structure of a game system according to an embodiment of the present invention.

FIG. 1 is the structure of a game system according to an embodiment of the present invention. As illustrated in FIG. 1, a game system 1 according to this embodiment includes a game terminal 10 and a server 30. The game terminal 10 is capable of mutual data communication with the server 30 through a network N.

The game terminal 10 is a computer for using by a user to play a game. For example, the game terminal 10 is a portable phone (including a smart phone), a personal digital assistant (including a tablet computer), a portable game machine, or a lap-top computer or the like.

As illustrated in FIG. 1, the game terminal 10 includes a control unit 11, a storage unit 12, a communication unit 13, an operating unit 14, a display unit 15, and a sound output unit 16. The control unit 11 includes at least one microprocessor, and executes information processing according to a program stored in the storage unit 12. The storage unit 12 includes a main storage unit (for example, a RAM) and an auxiliary storage unit (for example, a nonvolatile semiconductor memory, a hard disk drive, or a solid state drive), and stores programs and data. The communication unit 13 is used for data communication with other devices through the network N.

The operating unit 14 is used by a user to execute various operations. The display unit 15 displays various images, and includes, for example, a liquid crystal display or an organic EL display. The sound output unit 16 outputs sound data, and includes, for example, a speaker or a headphone. Although the operating unit 14 is separate from the display unit 15 in FIG. 1, the operating unit 14 may be integrally formed with the display unit 15 as a touch panel. The operating unit 14 may be a pointing device, such as a mouse, a button (key), or a lever (stick), or the like. The operating unit 14 may be a unit for executing operations by a user using sound or gesture.

The server 30 is, for example, a server computer. As illustrated in FIG. 1, the server 30 includes a control unit 31, a storage unit 32, and a communication unit 33. The control unit 31, the storage unit 32, and the communication unit 33 are similar to the control unit 11, the storage unit 12, and the communication unit 13 of the game terminal 10. The server 30 is allowed to access a database DB. The database DB may be constituted either in the server 30 or in any server computer other than the server 30.

A program and data are supplied to the game terminal 10 or the server 30 through the network N to be stored in the storage unit 12 or the storage unit 32. Any structural component (for example, an optical disk drive or a memory card slot) for reading a program and data stored in an information storage medium (for example, an optical disk or a memory card) may be provided to the game terminal 10 or the server 30, so that a program and data are supplied via an information storage medium to the game terminal 10 or the server 30.

The following description is based on an assumption that the game terminal 10 is a smart phone or a tablet computer equipped with a touch panel, and that a program downloaded via the network N is executed in the game terminal 10.

2. FUNCTIONS OUTLINE OF GAME SYSTEM

A technique for reducing power consumption by decreasing a frame rate in the game system 1 while assuring smooth change of an image displayed on the screen in response to an operation by a user will be described. While the game system 1 can execute various games, a trading card game is assumed here to be executed in the game system 1 to describe the above-mentioned technique. The game may be of a client/server type in which a game is executed through data communication between the game terminal 10 and the server 30 or of a stand-alone type in which a game is executed in the game terminal 10 by itself.

[2-1]

Initially, a trading card game will be outlined. A trading card game is a game in which a user combines a plurality of game cards, for examples, corresponding to monsters or magics to form a deck, and matches with an opponent, using the formed deck.

Figure 2:
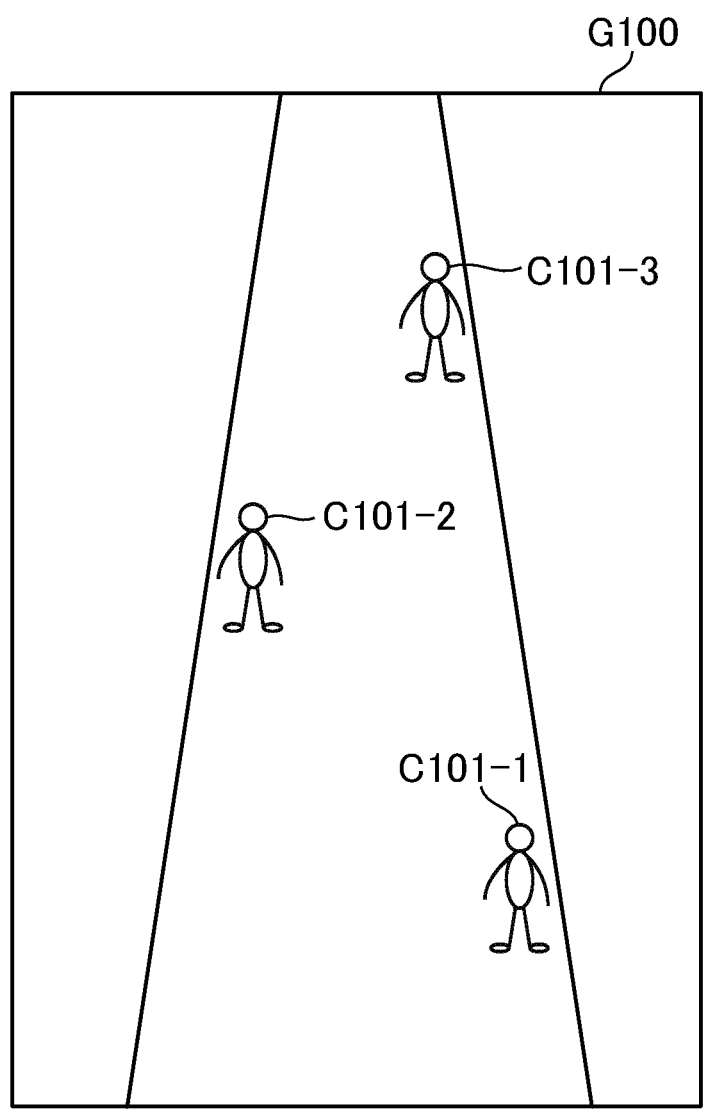
FIG. 2 is one example of an opponent selection image.
Figure 3:
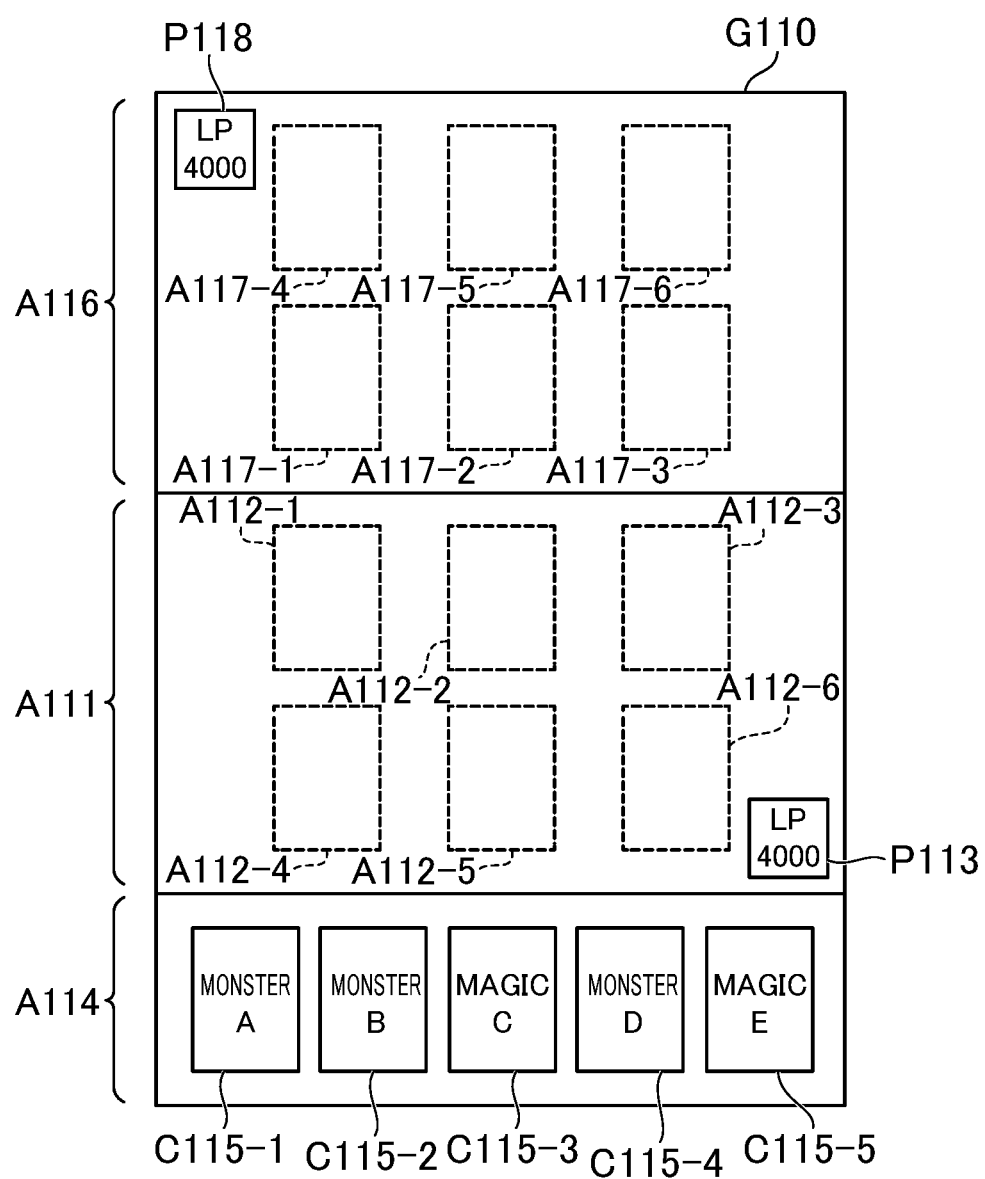
FIG. 3 is one example of an opponent image.
Figure 4:
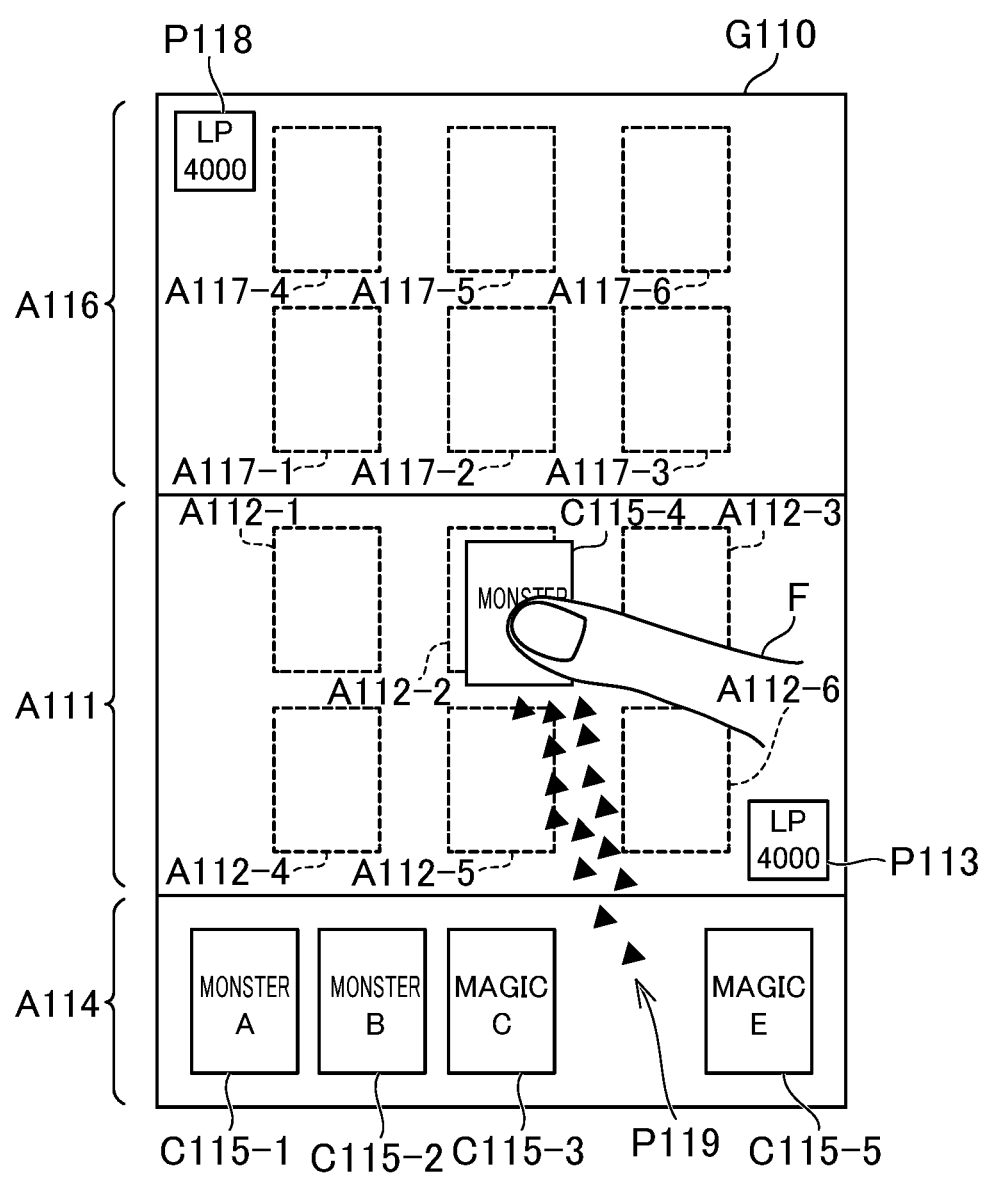
FIG. 4 is another example of an opponent image.

FIG. 2 to FIG. 4 is one example of an image displayed on a game screen (the display unit 15) in playing a trading card game. FIG. 2 is an example of an opponent selection image for selecting an opponent in a match. The opponent selection image G100 illustrated in FIG. 2 shows rival characters C101-1, C101-2, C101-3, which are potential opponents in a match.

In this trading card game, rival characters are disposed in a plurality of places in a virtual world. A user can perform a predetermined switching operation to thereby switch places to be shown in the opponent selection image G100. For example, the opponent selection image G100 illustrated in FIG. 2 shows a first place in the virtual world. In this case, a user's rightward flick operation brings a second place in the virtual world to appear in the opponent selection image G100, and a user's leftward flick operation brings a third place in the virtual world to appear in the opponent selection image G100.

When a user selects any rival character as an opponent in a match (for example, by tapping any rival character), a match against the rival character is executed. In actuality, the user will match with the CPU as the rival character is operated by the CPU.

FIG. 3 is one example of a match image. The match image G110 illustrated in FIG. 3 includes a user area A111. The user area A111 is an area for a user to place its game cards, and includes six boxes A112-1, A112-2, A112-3, A112-4, A112-5, A112-6. That is, the user's game cards are to be placed in these boxes. The user area A111 includes an element P113 that indicates the life point of a user. A user's life point is a parameter that is reduced by an attack by an opponent in a match. Zero point of a user's life point means defeat of the user.

The match image G110 further includes a hand area A114. A hand area A114 is an area for the user's hands. In the hand area A114, game cards C115-1, C115-2, C115-3, C115-4, C115-5 included in the hands are displayed. Images of monsters or magics, not illustrated in FIG. 3, are illustrated in the game cards C115-1 to C115-5.

The match image G110 further includes an opponent area A116. The opponent area A116 is an area for an opponent to place its cards, and includes six boxes A117-1, A117-2, A117-3, A117-4, A117-5, A117-6. That is, the opponent's game cards are to be placed in these boxes. The opponent area A116 includes an element P118 that indicates the life point of the opponent. An opponent's life point is a parameter that is reduced by an attack by the user. Zero point of an opponent's life point means victory of the user.

At the start of a match, four game cards are automatically drawn from the user's deck and added to the user's hands. Similarly, four game cards are automatically drawn from the opponent's deck and added to the opponent's hands. Thereafter, the user's turn and the opponent's turn will be alternately executed.

At the user's turn, the user initially draws one game card form its deck. The drawn game card is added to the user's hands. Thereafter, the user places any card from its hands in any of the boxes A112-1 to 112-6.

FIG. 4 is one example of the match image G110 with the user placing its game card C115-4 in the box A112-2. In this case, the user touches the game card C115-4 with its finger F for a drag operation to thereby move the game card C115-4 to the box A112-2, and then detaches the finger F from the touch panel. In this case, particles P119 indicating the trace of the finger F touching the touch panel are displayed. The particles P119 appear near the point touched by the finger F, and move while glittering to gradually disappear as time passes.

At the user's turn, the user can make an attack against the opponent, using the monster cards (game cards corresponding to monsters) placed in the boxes 112-1 to 112-3 closer to the opponent area A116. Further, the user can generate an effect advantageous to the user (or an effect disadvantageous to the opponent), using the magic cards (game cards corresponding to magics) placed in the boxes 112-4 to 112-6 farther from the opponent area A116. Specifically, the user can increase the attack power of the user's monster cards, decrease the attack power of the opponent's monster cards, or give a specific damage to the opponent.

After the user's turn, the opponent's turn is executed. At the opponent's turn, the opponent follows a similar procedure to that at the user's turn. The user's turn and the opponent's turn are alternately executed as described above until the life point of either of the user and the opponent becomes zero, which means the end of the match.

[2-2]

In this trading card game, the user is allowed to desirably set the frame rate of the game screen in consideration of the power consumption (battery consumption) of the game terminal 10.

FIG. 5 is one example of a setting image displayed on the display unit 15 for setting the frame rate. In the setting image G120 illustrated in FIG. 5, five options 1 to 5 are available as options for setting the frame rate. By selecting any of the five options 1 to 5, the user can change the setting of the frame rate. For example, an option with a smaller number leads to a lower frame rate, resulting in smaller power consumption of the game terminal 10. Only, an image displayed on the game screen hardly changes smoothly. On the contrary, an option with a larger number leads to a higher frame rate, enabling ready smooth change of an image displayed on the game screen. Only, larger power consumption of the game terminal 10 is resulted.

FIG. 6 explains the options 1 to 5. As illustrated in FIG. 6, the option 1 is an option of fixing the frame rate to a relatively low value (20 fps). According to the option 1, since the frame rate is fixed to a relatively low value, the power consumption of the game terminal 10 is reduced. Only, an image displayed on the game screen hardly changes smoothly. For example, the particles P119 in the match image G110 are hardly displayed smoothly, and the places shown in the opponent selection image G100 are hardly switched smoothly.

The options 2 to 4 are options of changing the frame rate depending on the presence or absence of an operation by a user. Of these options 2 to 4, the option 2 is an option of normally setting the frame rate to a relatively low basic value and increasing the frame rate when smooth change of an image displayed on the game screen is highly necessary. Specifically, according to the option 2, the frame rate is normally set to a relatively low basic value (20 fps), then temporarily increased to a value (30 fps) higher than the basic value when a user performs an operation (a case in which smooth change of an image displayed on the game screen is highly necessary), and thereafter gradually returned to the basic value over a predetermined period of time (two seconds). The frame rate is maintained at a value (30 fps) higher than the basic value while the operation by a user continues (while the touch panel is kept touched), and thereafter gradually returned to the basic value over a predetermined period of time (two seconds) once the user stops operating (the touch panel is no longer touched). Note that the above-mentioned predetermined period of time, which is set to two seconds in the example illustrated in FIG. 6, is not limited to two seconds, but may be set to any other period of time. Nevertheless, a short period of time is preferred as the above-described predetermined period of time as a long period of time as the predetermined period of time will increase the power consumption due to long continuation of a state with the frame rate set higher than the basic value.

According to the option 2, as the frame rate is normally set to a relatively low value, the game terminal 10 consumes less power. Further, according to the option 2, as the frame rate is temporarily increased when a user performs an operation, an image displayed on the game screen changes smoothly in response to the operation by the user. For example, the particles P119 in the match image G110 are displayed smoothly, and the places shown in the opponent selection image G100 are switched smoothly.

According to the option 2, the frame rate is increased to a value higher than the basic value, and then returned to the basic value. That is, a state with less power consumption is restored. Further, according to the option 2, the frame rate is increased to a value higher than the basic value, and thereafter gradually returned to the basic value over a predetermined period of time. For example, the particles P119 in the match image G110, which do not disappear as soon as a user detaches its finger F from the touch panel but are kept displayed for a while, are kept smoothly displayed after the user detaches its finger F from the touch panel according to the option 2 since the frame rate is kept higher than the basic value for a while.

The option 3 is an option of normally setting the frame rate to a higher basic value than that according to the option 2 and then decreasing the frame rate when the necessity for smooth change of an image displayed on the game screen is low. Specifically, according to the option 3, the frame rate is normally set to a higher basic value (30 fps) than that according to the option 2, then decreased to a value (20 fps) lower than the basic value in the case that a state without an operation by a user has continued for a reference period of time (for 30 seconds) (in the case with low necessity for smooth change of an image displayed on the game screen), and thereafter returned to the basic value when the user performs an operation. The aforementioned reference period of time, which is set to 30 seconds in the example illustrated in FIG. 6, is not limited to 30 seconds, but may be set to any other period of time. The reference period of time can be desirably set in consideration of the kinds, contents, characteristics or the like, of the game. For example, in games in which an image displayed on the game screen changes less frequently or games in which a user performs an operation after adequate consideration, the reference period of time may be set shorter than 30 seconds (for example, 15 seconds).

According to the option 3, as the frame rate is set to a basic value higher than that according to the option 2, an image displayed on the game screen changes smoothly. For example, the particles P119 in the match image G110 are displayed smoothly, and the places shown in the opponent selection image G100 are switched smoothly. Further, according to the option 3, as the frame rate is decreased when a state without an operation by a user continues, the power consumption of the game terminal 10 is reduced.

Through comparison between the options 2 and 3, it is known that the option 2 enables smaller power consumption of the game terminal 10 than the operation 3 since the frame rate is normally set to 20 fps according to the option 2 in contrast to the option 3 in which the frame rate is normally set to 30 fps, and that the option 3 enables smooth change of an image displayed on the game screen even in cases other than when a user performs an operation since the frame rate is normally set to 30 fps according to the option 3 in contrast to the option 2 in which the frame rate is set to 30 fps only when a user performs an operation.

The option 4 is an option of changing the frame rate depending on the presence or absence of an operation by a user. Specifically, according to the option 4, the frame rate is normally set to a relatively high basic value (30 fps), and then decreased to a value (20 fps) lower than the basic value when a state without an operation by a user has continued for a reference period of time (ten seconds). Further, the frame rate is temporarily increased to a value (60 fps) much higher than the basic value when the user performs an operation, and thereafter gradually returned to the basic value over a predetermined period of time (one second). The frame rate is kept at a value (60 fps) higher than the basic value while the user continues operating (while the touch panel is kept touched), and gradually returned to the basic value over a predetermined period of time (one second) when the user no longer operates (a state without touch on the touch panel). Note that the aforementioned reference period of time, which is set to ten seconds in the example illustrated in FIG. 6, is not limited to ten seconds, but may be set to any other period of time. The reference period of time may be desirably set in consideration of the kinds, contents, characteristics or the like of the game. Further, the aforementioned predetermined period of time, which is set to one second in the example illustrated in FIG. 6, is not limited to one second, but may be set to any other period of time. Nevertheless, a short period of time is preferred as the aforementioned predetermined period of time as a long period of time as the predetermined period of time increases power consumption due to long continuation of a state with the frame rate set higher than the basic value.

According to the option 4, as the frame rate is temporarily increased to 60 fps when a user performs an operation, an image displayed on the game screen changes very smoothly in response to the operation by the user. For example, the particles P119 in the match image G110 are displayed very smoothly, and the places shown in the opponent selection image G100 are switched very smoothly. Further, according to the option 4, as the frame rate is decreased to 20 fps in the case that a state without an operation by the user continues, the power consumption of the game terminal 10 is reduced.

According to the option 4, the frame rate is increased to 60 fps and then gradually returned to 30 fps over one second. The particles P119 in the match image G110, which do not disappear as soon as a user detaches its finger F from the touch panel but remain displayed for a while, as described above, remain displayed very smoothly after the user detaches its finger F from the touch panel according to the option 4 since the frame rate is kept high for a while.

The option 5 is an option of fixing the frame rate to the maximum possible frame rate (that is, the refresh rate of the display unit 35) for the game terminal 10. According to the option 5, as the frame rate is fixed to the maximum possible frame rate for the game terminal 10, an image displayed on the game screen changes very smoothly. For example, the particles P119 in the match image G110 are displayed very smoothly, and the places shown in the opponent selection image G100 are switched very smoothly. Only, large power consumption of the game terminal 10 is resulted. Note that fixing the frame rate to the maximum possible frame state (a refresh rate) of the game terminal 10 is not mandatory for the option 5 provided that the frame rate is fixed to a high value.

With the setting image G120 illustrated in FIG. 5, a user can perform a swipe operation in the right-left direction on the touch panel to thereby move the element P121 (the slider) in the right-left direction. That is, a user moves the element P121 to a position corresponding to its desired option to select any of the options 1 to 5. Additionally, a user can finish the setting for the frame rate by selecting an element P122. Before start of playing a game, a user sets a frame rate for playing the game beforehand via the setting image G120.

3. FUNCTIONAL BLOCK

Figure 7:
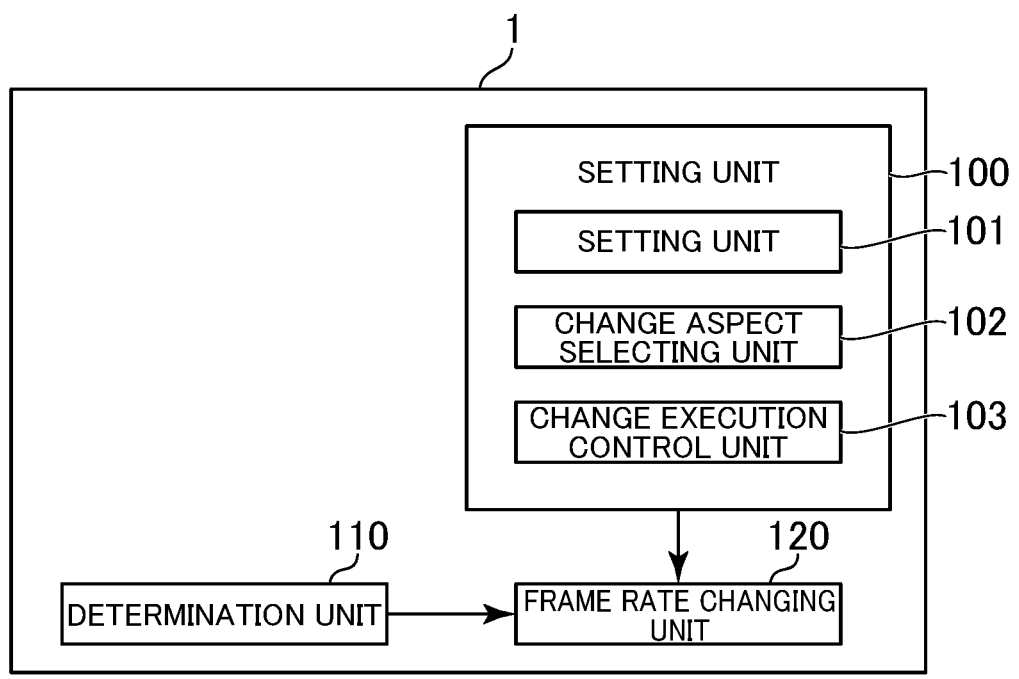
FIG. 7 is a functional block diagram illustrating a game system according to an embodiment of the present invention.

A structure for implementing the above-described game will now be described. FIG. 7 is a functional block diagram showing major functional blocks implemented in the game system 1. As illustrated in FIG. 7, the game system 1 includes a setting unit 100, a determination unit 110, and a frame rate changing unit 120. For example, these are implemented in the game terminal 10 (one example of the game control device). That is, the control unit 11 executes processing according to a program to thereby function as these functional blocks.

[3-1]

The setting unit 100 makes setting for a frame rate, based on an operation by a user. The setting unit 100 includes a basic value setting unit 101, a change aspect selecting unit 102, and a change execution control unit 103.

[3-1-1]

The basic value setting unit 101 sets the basic value of the frame rate of a game screen, based on a basic value setting operation by a user.

A "game screen" here refers to a screen displayed when a user plays a game, in other words, a screen which a user watches while playing a game. A "game screen" can be rephrased as a screen that is outputted while a game is being executed. For example, a screen where an object (a main character or the like) that is a representative of a user is displayed or a screen where an object that is an opponent in a game or an enemy of a user (for example, an opponent character or an enemy character) is displayed corresponds to one example of the "game screen". In the case of the aforementioned trading card game, the opponent selection image G100 and the match image G110 correspond to examples of an image displayed on the "game screen".

A "frame rate" refers to the number of frames to be processed per unit period of time. A "frame rate" can be rephrased as the number of frames of a screen (a game screen) to be displayed per unit period of time. Alternatively, a "frame rate" can be rephrased as an update interval of a screen. That is, a "frame rate" can be rephrased as an update interval (a generation interval) of an image to be displayed on a screen. A "frame rate" is normally expressed by the number of frames to be processed per second (a numeric value indicating the number of times of updates of a screen per second) in the unit of fps (frames per second). For example, the frame rate of 30 fps means that thirty frames are processed per second (that is, an image displayed on a screen is updated thirty times per second, in other words, an image displayed on a screen is updated for every $\frac{1}{30}^{th}$ of a second), so that a motion picture including thirty frames per second is displayed on a screen. Thus, a "frame rate" can be rephrased as the number of frames of a motion picture to be displayed on a screen per second.

A "basic value" is a value of a frame rate that is normally set when a user plays a game.

A "basic value setting operation" refers to an operation for setting the basic value of a frame rate. This operation is performed via the operating unit 14. In the case of the aforementioned trading card game, an operation of selecting any of the options 1 to 5 shown in the setting image G120 corresponds to one example of the "basic value setting operation". That is, an operation of moving the element P121 in the setting image G120 corresponds to one example of the "basic value setting operation".

"To set the basic value, based on a basic value setting operation" means, for example, to set the basic value of the frame rate to a value in accordance with a basic value setting operation. In other words, the basic value of the frame rate is set to a value desired by a user.

In the case of the aforementioned trading card game, the basic value setting unit 101 sets the basic value of the frame rate, based on the option selected by a user from the options 1 to 5 shown in the setting image G120. For example, when the option 1 or 2 is selected, the basic value setting unit 101 sets the basic value to 20 fps. When the option 3 or 4 is selected, the basic value setting unit 101 sets the basic value to 30 fps. When the option 5 is selected, the basic value setting unit 101 sets the basic value to the maximum frame rate of the game terminal 10.

[3-1-2]

The change aspect selecting unit 102 selects any of a plurality of kinds of aspects as an aspect for changing the frame rate by the frame rate changing unit 120, based on a change aspect selection operation by a user.

Here, a "change aspect selection operation" refers to an operation of selecting any of a plurality of kinds of aspects as an aspect for changing the frame rate. This operation is performed via the operating unit 14. In the case of the aforementioned trading card game, the options 2 to 4 shown in the setting image G120 correspond to an example of "a plurality of kinds of aspects". Thus, an operation of selecting any of the options 2 to 4 corresponds to one example of the "change aspect selection operation". That is, an operation of moving the element P121 in the setting image G120 corresponds to one example of the "change aspect selection operation".

"To select any of a plurality of kinds of aspects as an aspect for changing the frame rate, based on a change aspect selection operation" means to select the aspect selected by a user from a plurality of kinds of aspects, as an aspect for changing the frame rate.

In the case of the aforementioned trading card game, the change aspect selecting unit 102 selects an aspect corresponding to the option selected by a user from the options 1 to 5 shown in the setting image G120, as an aspect for changing the frame rate. For example, when the option 2 is selected, the change aspect selecting unit 102 selects an aspect corresponding to the option 2. In this case, an aspect in which "the frame rate is normally set to 20 fps (a basic value), then temporarily increased to 30 fps when a user performs an operation, and thereafter gradually returned to 20 fps over two seconds" is selected (refer to FIG. 6).

[3-1-3]

The change execution control unit 103 determines, based on a change necessity/non-necessity selection operation by a user, whether to execute changing of the frame rate by the frame rate changing unit 120.

A "change necessity/non-necessity selection operation" here refers to an operation of selecting whether it is necessary or unnecessary to change the frame rate, in other words, an operation of selecting whether to execute or not execute changing of the frame rate. This operation is performed via the operating unit 14. In the case of the aforementioned trading card game, an operation of selecting any of the options 1 to 5 shown in the setting image G120 corresponds to one example of the "change necessity/non-necessity selection operation". That is, an operation of moving the element P121 in the setting image G120 corresponds to one example of the "change necessity/non-necessity selection operation".

"To determine, based on a change necessity/non-necessity selection operation by a user, whether to execute changing of the frame rate" means to determine to execute changing of the frame rate when a user has selected to execute changing of the frame rate and to determine not to execute changing of the frame rate when a user has selected not to execute changing of the frame rate.

In the case of the aforementioned trading card game, the change execution control unit 103 determines, based on the option selected by a user from the options 1 to 5 shown in the setting image G120, whether to execute changing of the frame rate by the frame rate changing unit 120. For example, when either of the options 1 and 5 is selected, the change execution control unit 103 determines not to execute changing of the frame rate by the frame rate changing unit 120. Meanwhile, when any of the options 2 to 4 is selected, the change execution control unit 103 determines to execute changing of the frame rate by the frame rate changing unit 120.

[3-2]

The determination unit 110 determines as to the presence or absence of an operation relative to the operating means while a game is being executed. For example, the determination unit 110 determines whether an operation relative to the operating means has been performed. Further, for example, the determination unit 110 determines whether a state without an operation relative to the operating means has continued for a reference period of time.

"While a game is being executed" can be rephrased as "while a game is being played". That is, this can be rephrased as "while a game is being played for accomplishment of a game goal". A "game goal" refers to a goal for a user to accomplish in a game, and is set according to the content of the game. Examples of the "game goal" may include, for example, to win over an opponent, to defeat a specific opponent character, to increase the level of a user or a character (a main character) that is a representative of a user. In the case of the aforementioned trading card game, a period during which a trading card game is being played corresponds to "while a game is being executed". For example, a period during which the opponent selection image G100 or the match image G110 is displayed corresponds to "while a game is being executed".

An "operating means" refers to a means for use by a user to perform an operation. An "operating means" can be rephrased as a means for receiving an operation by a user. For example, touch panels, buttons, keys, levers, mice, or trackpads correspond to examples of the "operating means". For example, in the case that the main body of a device or of a controller is tilted or moved to make an operation, the main body of the device or of the controller corresponds to one example of the "operating means" In the case of the aforementioned trading card game, the operating unit 14 (a touch panel) corresponds to one example of the "operating means".

"An operation relative to the operating means" refers to an operation performed by a user with respect to an operating means. This can be rephrased as an operation performed by a user via an operating means. "To determine as to the presence or absence of an operation" means to determine whether an operation has been performed. In other words, whether it is a state without an operation is determined.

A case "in which a state without an operation has continued for a reference period of time" refers to a case in which a new operation is not performed for a reference period of time after an operation is performed. In other words, the case corresponds to a case in which a reference period of time has elapsed without a new operation performed after an operation.

In the case of the aforementioned trading card game, the determination unit 110 determines as to the presence or absence of a touch operation relative to the touch panel while a trading card game is being played. That is, the determination unit 110 determines whether the touch panel has been touched by a finger or the like.

[3-3]

While a game is being executed, the frame rate changing unit 120 changes the frame rate of the game screen, based on the result of determination by the determination unit 110. Specifically, the frame changing unit 120 sets a lower frame rate when no operation is performed relative to the operating means, compared with a case with an operation performed. For example, the frame rate changing unit 120 normally sets the frame rate to the basic value. Then, when no operation is performed relative to the operating means, the frame rate changing unit 120 sets the frame rate to a lower value than the basic value. Note that the frame rate changing unit 120 changes the frame rate according to an aspect selected by the change aspect selecting unit 102.

"To change the frame rate" means to increase or decrease the value of the frame rate.

"To change the frame rate, based on the result of determination" means to determine whether to change the frame rate, based on the result of determination. Alternatively, a manner of changing the frame rate may be determined, based on the result of determination.

"When no operation is performed" refers to a case, for example, in which a state without an operation has continued for a reference period of time.

"When no operation is performed, a lower frame rate is set, compared with a case with an operation performed" means to set the frame rate lower when no operation is performed than a frame rate when an operation is performed. For example, the frame rate is normally set to the basic value, and then decreased to a value lower than the basic value when no operation is performed. Alternatively, the frame rate may be normally set to the basic value, and then increased to a value higher than the basic value when an operation is performed. Still alternatively, the frame rate may be normally set to the basic value, then decreased to a value lower than the basic value when no operation is performed, and temporarily increased to a value higher than the basic value when an operation is performed, to be thereafter returned to the basic value.

For example, in the case that the determination unit 110 determines that a state without an operation relative to the operating means has continued for a reference period of time, the frame rate changing unit 120 decreases the frame rate to a first value lower than the basic value.

For example, in the case that the determination unit 110 determines that an operation relative to the operating means has been performed with the decreased frame rate at the first value, the frame rate changing unit 120 increases the frame rate to the basic value.

"To increase the frame rate to the basic value" here means, for example, to increase the frame rate from the first value to the basic value all at once (at one time or immediately).

For example, upon determination by the determination unit 110 that an operation relative to the operating means has been performed, the frame rate changing unit 120 increases the frame rate to a second value higher than the basic value, and thereafter decreases the frame rate to the basic value. In this case, after increase of the frame rate to the second value, the frame rate changing unit 120 decreases the frame rate from the second value to the basic value over a predetermined period of time. Also, upon determination by the determination unit 110 that an operation relative to the operating means has been performed during the process of decreasing the frame rate from the second value, the frame rate changing unit 150 increases the frame rate to the second value. The frame rate changing unit 120 may increase the frame rate to the second value, which is higher than the basic value, and thereafter decrease the frame rate not to the basic value but to the first value, which is lower than the basic value. In this case, after decrease of the frame rate to the first value, which is lower than the basic value, the frame rate changing unit 120 may return the frame rate to the basic value.

"To increase the frame rate to a second value" means, for example, to increase the frame rate from the basic value to a second value all at once (at one time or immediately). "To increase the frame rate to a second value and thereafter decrease to the basic value (or the first value)" means to temporarily increase the frame rate to a second value, and then decrease the frame rate to the basic value (or the first value). After the frame rate is temporarily increased to the second value, the frame rate may be decreased to the basic value (or the first value) either gradually or all at once. Alternatively, after the frame rate is temporarily increased to the second value, the frame rate may be started being decreased immediately or after an elapse of a predetermined period of time. "The frame rate is temporarily increased to a second value" means to set the frame rate to the second value only for a limited period of time rather than permanently. "A limited period of time" may mean, for example, either a moment or a period of time during which a user is performing an operation.

"To decrease the frame rate from the second value to the basic value (or the first value) over a predetermined period of time" means to gradually decrease the frame rate from the second value to the basic value (or the first value) over a predetermined period of time. In this case, the speed for decreasing the frame rate may or may not be constant. For example, the speed may be gradually accelerated.

"During the process of decreasing the frame rate from the second value" means to be on the way of gradual decrease of the frame rate from the second value toward the basic value (or the first value). "Upon determination that an operation has been performed during the process of decreasing the frame rate from the second value, the frame rate is increased to the second value" means to stop decreasing the frame rate and then to increase the frame rate to the second value again in the case that it is determined that an operation has been performed while the frame rate is gradually decreasing from the second value to the basic value (or the first value).

In the case that the option 2 is selected in the aforementioned trading card game, the frame rate changing unit 120 normally sets the frame rate to 20 fps (one example of the basic value) as illustrated in FIG. 6. In this case, the determination unit 110 determines whether the touch panel has been touched. Upon determination that the touch panel has been touched, the frame rate changing unit 120 temporarily increases the frame rate to 30 fps (one example of the second value), and thereafter gradually returns the frame rate from 30 fps to 20 fps over two seconds (one example of a predetermined period). Note that the frame rate changing unit 120 keeps the frame rate at 30 fps while the touch panel is being touched, and gradually returns the frame rate from 30 fps to 20 fps over two seconds once touch on the touch panel is released.

In the case that the option 3 is selected in the aforementioned trading card game, the frame rate changing unit 120 normally sets the frame rate to 30 fps (one example of the basic value), as illustrated in FIG. 6. In this case, the determination unit 110 determines whether a state without touch on the touch panel has continued for 30 seconds (one example of the reference period of time). Upon determination that such a state without touch on the touch panel has continued for 30 seconds, the frame rate changing unit 120 decreases the frame rate to 20 fps (one example of the first value). Further, the determination unit 110 determines whether the touch panel has been touched, with the frame rate having been decreased to 20 fps. Upon determination that the touch panel has been touched, the frame rate changing unit 120 returns the frame rate to 30 fps.

In the case that the option 4 is selected in the aforementioned trading card game, the frame rate changing unit 120 normally sets the frame rate to 30 fps (one example of the basic value), as illustrated in FIG. 6. In this case, the determination unit 110 determines whether the touch panel has been touched. Further, the determination unit 110 determines whether a state without touch on the touch panel has continued for ten seconds (one example of the reference period of time). Upon determination that such a state without touch on the touch panel has continued for ten seconds, the frame rate changing unit 120 decreases the frame rate to 10 fps (one example of the first value). On the contrary, upon determination that the touch panel has been touched, the frame rate changing unit 120 temporarily increases the frame rate to 60 fps (one example of the second value), and thereafter gradually returns the frame rate from 60 fps to 30 fps over one second (one example of the predetermined period of time). Note that the frame rate changing unit 120 keeps the frame rate at 60 fps while the touch panel is kept touched, and gradually returns the frame rate from 30 fps to 20 fps over one second once the touch on the touch panel is released.

In the case that either the option 1 or 5 is selected in the aforementioned trading card game, the frame rate is fixed to the basic value, and the frame rate changing unit 120 does not change the frame rate.

4. PROCESSING

Processing to be executed by the game system 1 will now be described.

[4-1]

Figure 8:
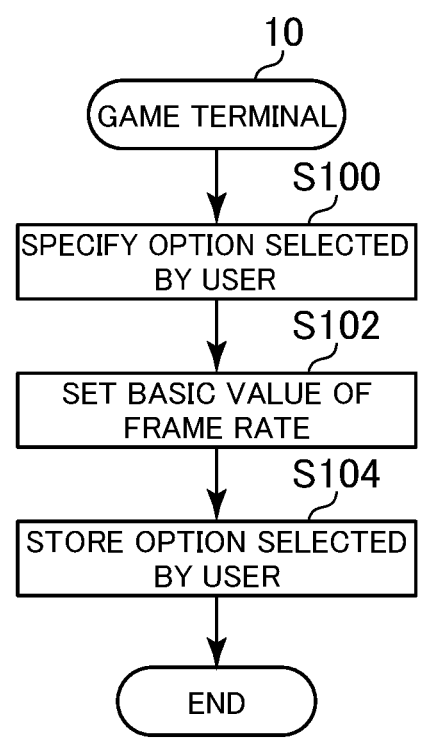
FIG. 8 is one example of processing to be executed in a game system.

FIG. 8 is one example of the processing to be executed by the game terminal 10 upon selection of any of the options 1 to 5, that is, when the element P121 (the slider) in the setting image G120 has been moved. The control unit 11 executes the processing illustrated in FIG. 8 according to a program to thereby function as the setting unit 100.

As illustrated in FIG. 8, the control unit 11 initially specifies the option selected by a user (S100). That is, the control unit 11 specifies an option among the options 1 to 5, the option corresponding to the position of the element P121 (the slider). Then, the control unit 11 sets a basic value corresponding to the option selected by the user as the basic value of the frame rate (S102). The control unit 11 stores information indicating the option selected by the user in the storage unit 12 (S104), so that the frame rate will be thereafter controlled, based on the option stored in the storage unit 12.

[4-2]

Figure 9:
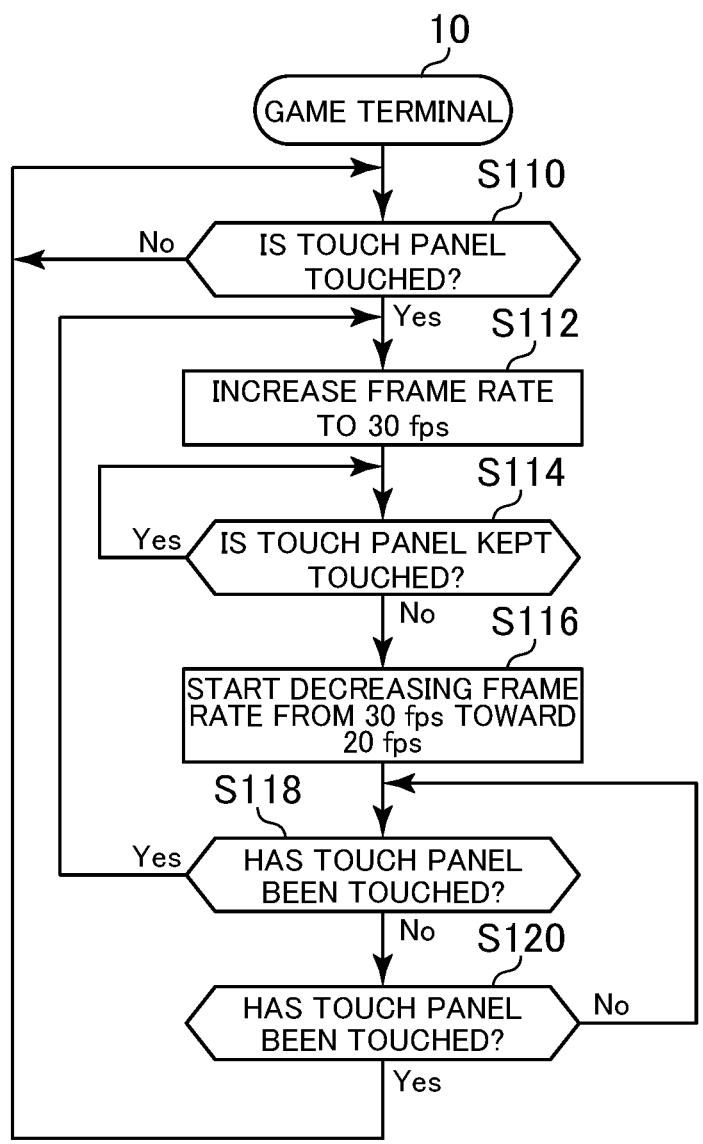
FIG. 9 is one example of another processing to be executed in a game system.

In the case that the option 2 is selected, the basic value of the frame rate is set to 20 fps at step S102. With the option 2 selected, for example, the processing illustrated in FIG. 9 is executed in the game terminal 10. Specifically, the control unit 11 executes the processing illustrated in FIG. 9 according to a program to thereby function as the determination unit 110 and the frame rate changing unit 120. In actuality, the game processing (for example, processing for displaying and updating the opponent selection image G100 and the match image G110) is repetitively executed at an interval according to the frame rate, though the repetitive processing is not illustrated in FIG. 9, with only processing relevant to change of the frame rate illustrated.

With the option 2 selected, the control unit 11 determines whether the touch panel is touched (S110), as illustrated in FIG. 9. Upon determination that the touch panel is not touched, the control unit 11 continues step S110. On the contrary, upon determination that the touch panel is touched, the control unit 11 increases the frame rate to 30 fps (S112). Thereafter, the control unit 11 determines whether the touch panel is kept touched (S114). Upon determination that the touch panel is kept touched, the control unit 11 continues step S114. On the contrary, upon determination that the touch panel is not kept touched, the control unit 11 starts decreasing the frame rate from 30 fps toward 20 fps (S116). In this case, the speed for decreasing the frame rate is set to such a speed that takes two seconds to decrease the frame rate from 30 fps to 20 fps.

After start of decreasing the frame rate from 30 fps toward 20 fps, the control unit 11 determines whether the touch panel has been touched (S118). Upon determination that the touch panel has been touched, the control unit 11 executes step S112 again. In this case, the control unit 11 stops decreasing the frame rate toward 20 fps, and increases the frame rate to 30 fps instead. On the contrary, upon determination that the touch panel has not been touched, the control unit 11 determines whether the frame rate has been decreased to 20 fps (S120). Upon determination that the frame rate has not yet been decreased to 20 fps, the control unit 11 executes step S118 again. On the contrary, upon determination that the frame rate has been decreased to 20 fps, the control unit 11 executes step S110 again.

[4-3]

Figure 10:
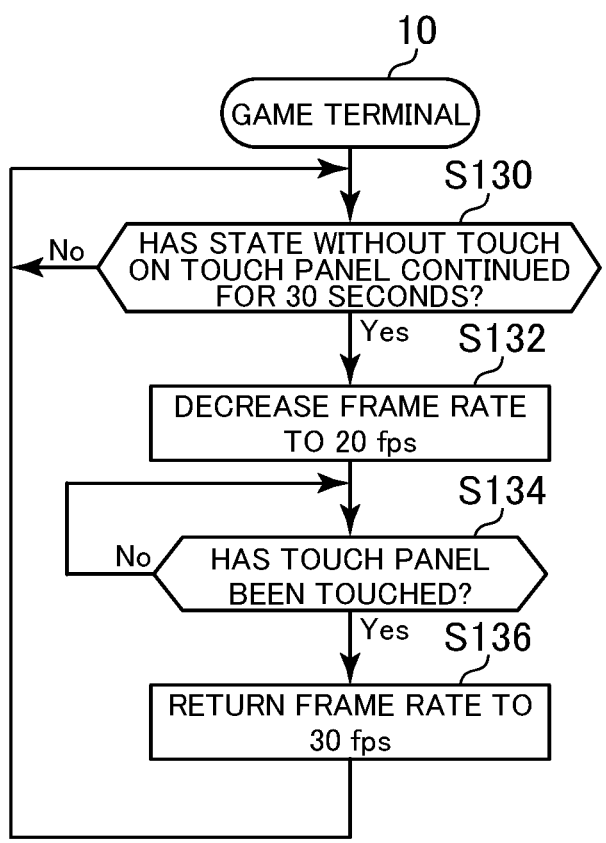
FIG. 10 is one example of another processing to be executed in a game system.

In the case that the option 3 is selected, the basic value of the frame rate is set to 30 fps at step S102. With the option 3 selected, for example, the processing illustrated in FIG. 10 is executed in the game terminal 10. Specifically, the control unit 11 executes the processing illustrated in FIG. 10 according to a program to thereby function as the determination unit 110 and the frame rate changing unit 120. Note that, similar to FIG. 9, in actuality, the game processing is repetitively executed at an interval in accordance with the frame rate, though the repetitive processing is not illustrated in FIG. 10, with only processing relevant to change of the frame rate illustrated.

With the option 3 selected, as illustrated in FIG. 10, the control unit 11 monitors whether a state without touch on the touch panel has continued for 30 seconds (S130). This determination is made with a time measuring function provided to the game terminal 10. Upon determination that such a state without touch on the touch panel has not continued for 30 seconds, the control unit 11 continues step S130. On the contrary, upon determination that such a state without touch on the touch panel has continued for 30 seconds, the control unit 11 decreases the frame rate to 20 fps (S132).

With the frame rate decreased to 20 fps, the control unit 11 monitors whether the touch panel has been touched (S134). Upon determination that the touch panel has been touched, the control unit 11 returns the frame rate to 30 fps (S136), and thereafter executes step S130. On the contrary, upon determination that the touch panel has not been touched, the control unit 11 continues step S134.

[4-4]

Figure 11:
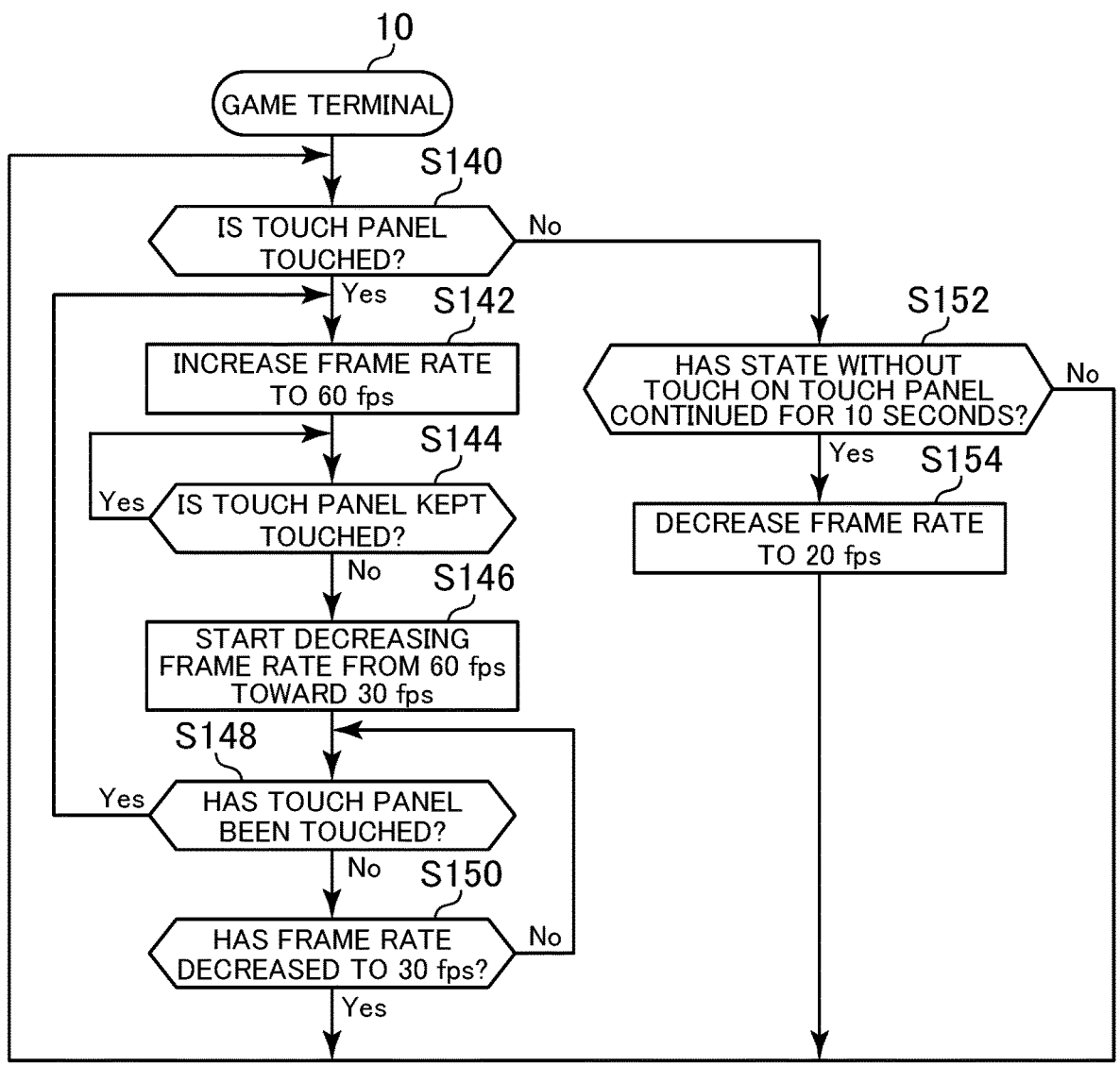
FIG. 11 is one example of another processing to be executed in a game system.

In the case that the option 4 is selected, the basic value of the frame rate is set to 30 fps at step S102. With the option 4 selected, for example, the processing illustrated in FIG. 11 is executed in the game terminal 10. Specifically, the control unit 11 executes the processing illustrated in FIG. 11 according to a program to thereby function as the determination unit 110 and the frame rate changing unit 120. Note that, similar to FIG. 9, in actuality, the game processing is repetitively executed at an interval in accordance with the frame rate, though the repetitive processing is not illustrated in FIG. 11, with only processing relevant to change of the frame rate illustrated.

With the option 4 selected, as illustrated in FIG. 11, the control unit 11 determines whether the touch panel is touched (S140). Upon determination that the touch panel is touched, the control unit 11 increases the frame rate to 60 fps (S142). Thereafter, the control unit 11 determines whether the touch panel is kept touched (S144). Upon determination that the touch panel is kept touched, the control unit 11 continues step S144. On the contrary, upon determination that the touch panel is not kept touched, the control unit 11 starts decreasing the frame rate from 60 fps toward 30 fps (S146). In this case, the speed for decreasing the frame rate is set to such a speed that takes one second to decrease the frame rate from 60 fps to 30 fps.

After start of decreasing the frame rate from 60 fps toward 30 fps, the control unit 11 determines whether the touch panel has been touched (S148). Upon determination that the touch panel has been touched, the control unit 11 executes step S142 again. In this case, the control unit 11 stops decreasing the frame rate toward 30 fps, and increases the frame rate to 60 fps instead. On the contrary, upon determination that the touch panel has not been touched, the control unit 11 determines whether the frame rate has been decreased to 30 fps (S150). Upon determination that the frame rate has yet to be decreased to 30 fps, the control unit 11 executes step S148 again. On the contrary, upon determination that the frame rate has been decreased to 30 fps, the control unit 11 executes step S140 again.

Upon determination that the touch panel is not touched at S140, the control unit 11 determines whether a state without touch on the touch panel has continued for ten seconds (S152). This determination is made with a time measuring function provided to the game terminal 10. Upon determination that such a state without touch on the touch panel has not continued for ten seconds, the control unit 11 executes step S140 again. On the contrary, upon determination that such a state without touch on the touch panel has continued for ten seconds, the control unit 11 decreases the frame rate to 20 fps (S154). Thereafter, the control unit 11 executes step S140 again.

[4-5]

In the case that the option 1 is selected, the basic value of the frame rate is set to 20 fps at step S102. In the case that the option 5 is selected, the basic value of the frame rate is set to the maximum possible frame rate for the game terminal 10 at step S102. In these cases, the frame rate is fixed to the basic value, and will not be changed from the basic value.

5. CONCLUSION

The above-described game system 1 sets the basic value of the frame rate of a game screen, based on the option selected by a user from the options 1 to 5. Further, when any of the options 2 to 4 is selected, the frame rate is changed, based on the result of determination as to the presence or absence of touch on the touch panel.

For example, with either the option 3 or 4 selected, the frame rate is set to a value lower than the basic value when the touch panel is not touched, so that power consumption is reduced. On the contrary, when the touch panel is touched, the frame rate is set to the basic value set by a user or a value higher than the basic value, so that change of an image displayed on the game screen with such smoothness as the user wishes can be assured.

With selection of either the option 3 or 4, the frame rate is normally set to the basic value, and then decreased to a value lower than the basic value when a state without touch on the touch panel has continued for a reference period of time, so that the power consumption can be reduced when the touch panel is not touched. Note here that a user is not always operating, and thus changing the frame rate also when a state without touch on the touch panel has continued only for a short while may lead to change of the frame rate at a needlessly high frequency, which the user may possibly find uncomfortable. Regarding this point, such inconvenience can be avoided according to the options 3 and 4 in which the frame rate is decreased when a state without touch on the touch panel has continued for a reference period of time.

For example, with either the option 2 or 4 selected, as the frame rate is temporarily increased to a value higher than the basic value when the touch panel is touched, it is possible to assure that an image (for example, the particles P119) displayed on the game screen will smoothly change without failure in response to an operation by a user. Although keeping the frame rate to a value higher than the basic value will increase power consumption, increase in power consumption can be avoided according to the options 2 and 4 as the frame rate is temporarily increased and then returned to the basic value.

With either the option 2 or 4 selected, since the increased frame rate is returned to the basic value over a predetermined period of time, the frame rate is maintained higher than the basic value for the predetermined period of time. This assures smooth change of an image displayed on the game screen for a while after the touch panel has been touched.

With either the option 2 or 4 selected, since the frame rate is increased also when the touch panel has been touched while the frame rate is returning to the basic value, smooth change of an image displayed on the game screen can be assured also in the case that the touch panel is successive touched.

With the option 3 selected, since the frame rate is returned to the basic value when the touch panel has been touched with the frame rate having been decreased, smooth change of an image displayed on the game screen can be assured.

The game system 1 allows a user to select any of the options 1 to 5 to thereby set an aspect for changing the frame rate to its desired aspect. Also, a user can select any of the options 1 to 5 to thereby desirably set whether to execute changing of the frame rate.

6. MODIFIED EXAMPLE

The present invention is not limited to the above-described embodiments.

[6-1]

For example, the frame rate changing unit 120 may increase the frame rate when the situation of a game is a specific situation.

A "specific situation" refers to a specific situation in which smooth change of an image displayed on a game screen is needed, for example, including a case in which an image displayed on a game screen changes largely, specifically, a case in which game screens (for example, the place displayed on a game screen is switched to a different place) are switched. Such cases include cases of displaying on the game screen, for example, occurrence of a special game event that is desired to appear smoothly changing to a user, appearance of a special game character, and performance of a special movement of a game character.

"To increase the frame rate when the situation of a game is a specific situation" means to increase the frame rate to a value higher than the basic value when the situation of a game turns into a specific situation.

In the aforementioned trading card game (the options 2 and 4), the frame rate changing unit 120 may increase the frame rate to a value higher than the basic value irrespective of the presence or absence of a touch on the touch panel, for example, in the case that an animation showing a monster attacking an opponent at a user's turn is displayed on a game screen or that an animation showing a monster attacking a user at an opponent's turn is displayed on a game screen.

As described above, since the frame rate is increased when the situation of a game is a specific situation, it is possible to have an image displayed on a game screen change smoothly, for example, when the situation of a game is a specific situation in which an image displayed on a game screen is desired to appear smoothly changing.

[6-2]

All or some of the setting unit 100, the determination unit 110, and the frame rate changing unit 120 may be implemented in the server 30 (one example of the game control device). That is, information indicating an operation performed by a user via the operating unit 14 may be transmitted to the server 30 via the communication unit 13, so that setting by the setting unit 100, determination by the determination unit 110, or change by the frame rate changing unit 120 may be executed in the server 30, based on the information, and the result of setting by the setting unit 100, the result of determination by the determination unit 110, or an instruction for change by the frame rate changing unit 120 may be sent from the server 30 to the game terminal 10 via the communication unit 33. For example, in the case that an instruction for change by the frame rate changing unit 120 is sent from the server 30 to the game terminal 10, the frame rate in the game terminal 10 may be changed, based on the instruction for change.

[6-3]

Although an example has been mainly described in the above in which the present invention is applied to a trading card game, the present invention is applicable to various other games. Further, although a case has been described in the above in which the present invention is applied to the game system 1 or the game terminal 10, or an example of an information processing system or an information processing device, the present invention is applicable to an information processing system or an information processing device other than the game system 1 or the game terminal 10.

7. APPENDIX

Based on the above description, the present invention can be understood as follows, for example. Reference numerals included in the drawings are described below with parentheses to help ready understanding of the present invention, but not intended to limit the present invention to the embodiments illustrated.

1) A game control device (10 or 30) according to one aspect of the present invention includes a basic value setting unit (101) for setting the basic value of the frame rate of a game screen, based on a basic value setting operation by a user; a determination unit (110) for determining as to the presence or absence of an operation relative to an operating unit (14) while a game is being executed; and a frame rate changing unit (120) for changing the frame rate of the game screen, based on the result of determination by the determination unit (14), while the game is being executed, wherein the frame rate changing unit (120) sets the frame rate to a value lower than the basic value when no operation relative to the operating unit (14) is performed while the game is being executed.

10) A game system (1) according to one aspect of the present invention includes a basic value setting unit (101) for setting the basic value of the frame rate of a game screen, based on a basic value setting operation by a user; a unit (110 or 120) for obtaining the result of determination as to the presence or absence of an operation relative to an operating unit (14) while a game is being executed; and a frame rate changing unit (120) for changing the frame rate of the game screen, based on the result of determination, while the game is being executed, wherein the frame rate changing unit (120) sets the frame rate to a value lower than the basic value when no operation relative to the operating unit (14) is performed.

11) A program according to one aspect of the present invention is a program for causing a computer to function as the game control device (10 or 30) described in any of 1) to 9) or the game system (1) described in 10).

12) An information storage medium according to one aspect of the present invention is a computer readable information storage medium storing the program described in 11).

13) A control method for a game control device (10 or 30) or a game system (1) according to one aspect of the present invention, includes a basic value setting step (S102) of setting the basic value of the frame rate of a game screen, based on a basic value setting operation by a user; a determination step (S110, S114, S118, S130, S134, S140, S144, S148, S152) of determining as to the presence or absence of an operation relative to an operating unit (14) while a game is being executed; and a frame rate changing step (S112, S132, S136, S142, S154) of changing the frame rate of the game screen, based on the result of determination, at the determination step while the game is being executed, wherein at the frame rate changing step (S132, S154), the frame rate is set to a value lower than the basic value when no operation relative to the operating unit (14) is performed while the game is being executed.

According to the invention described in 1), 10) to 13), the basic value of the frame rate of a game screen is set, based on a basic value setting operation by a user, and the frame rate is changed, based on the result of determination as to the presence or absence of an operation relative to the operating unit, while the game is being executed, such that the frame rate is set to a value lower than the basic value when no operation is performed. Thus, the frame rate is set to a value lower than the basic value when no operation is performed, so that the power consumption can be reduced. Meanwhile, the frame rate is set to the basic value set by the user when an operation is performed, so that it is assured that an image displayed on the game screen will change with such smoothness as the user wishes. That is, it is possible to reduce the power consumption by reducing the frame rate, while assuring smooth change of an image displayed on the game screen in response to an operation by a user.

2) In one embodiment of the present invention, the determination unit (110) may determine whether a state without an operation relative to the operating unit (14) has continued for a reference period of time, and the frame rate changing unit (120) may decrease the frame rate to a first value lower than the basic value when the determination unit (110) determines that a state without an operation relative to the operating unit (14) has continued for the reference period of time.

According to the invention described in 2), since the frame rate is normally set to the basic value, and then reduced to the first value lower than the basic value when a state without operation has continued for a reference period of time, it is possible to reduce the power consumption when no operation is performed. Note that a user is not always operating. If the frame rate should be changed also when a user does not operate only for a short while, useless change of the frame rate may be resulted. This may lead to highly frequent change of the frame rate, and may possibly cause a user to feel uncomfortable. Regarding this point, as the frame rate is decreased when a state without an operation has continued for a reference period of time according to the present invention, such inconvenience can be avoided.

3) In one embodiment of the present invention, the frame rate changing unit (120) may increase the frame rate to a second value higher than the basic value when the determination unit (110) determines that an operation relative to the operating unit (14) has been performed, and thereafter may decrease the frame rate to the basic value or the first value lower than the basic value.

According to the invention described in 3), as the frame rate is temporarily increased to the second value higher than the basic value when an operation has been performed, it is possible to assure that an image displayed on the game screen will change smoothly in response to an operation by a user. Although keeping the frame rate set to the second value may increase the power consumption, increase in power consumption can be prevented according to the present invention, as the frame rate is temporarily increased to the second value, and thereafter decreased to the basic value or the first value lower than the basic value.

4) In one embodiment of the present invention, after increasing the frame rate to the second value, the frame rate changing unit (120) may decrease the frame rate from the second value to the basic value or the first value over a predetermined period of time.

According to the invention described in 4), after the frame rate is increased to the second value in response to an operation, the frame rate is decreased from the second rate to the basic value or the first value over a predetermined period of time. Thus, the frame rate is kept high for a while. Note that change of an image in response to an operation by a user will not end immediately after the end of the operation by the user, but continue for a while in some cases. According to the present invention, it is possible to assure that an image will change smoothly for a while after an operation by a user in response to the operation by the user.

5) In one embodiment of the present invention, the frame rate changing unit (120) may increase the frame rate to the second value when the determination unit (110) determines that an operation relative to the operating unit (14) has been performed while the frame rate is being decreased from the second value.

Note that when a user performs an operation, it is highly likely that an operation be made successively. According to the invention described in 5), as the frame rate is increased to the second value also when an operation is performed while the frame rate is being decreased from the second rate, it is possible to assure that an image displayed on a game screen will change smoothly also in response to an operation subsequently performed.

6) In one embodiment of the present invention, the frame rate changing unit (120) may increase the frame rate to the basic value when the determination unit (110) determines that an operation relative to the operating unit (14) has been performed, with the frame rate having been decreased to the first value.

According to the invention described in 6), as the frame rate is returned to the basic value when an operation has been performed with the frame rate having been decreased to the first value, it is possible to assure that an image displayed on the game screen will change smoothly in response to an operation by a user.

7) In one embodiment of the present invention, the frame rate changing unit (120) may increase the frame rate to a value higher than the basic value when a situation of the game is a specific situation.

According to the invention described in 7), as the frame rate is increased to a value higher than the basic value when the situation of a game is a specific situation, it is possible to have an image displayed on the game screen change smoothly, for example, when the situation of the game is a specific situation in which an image displayed on the game screen is desired to appear smoothly changing.

8) In one embodiment of the present invention, a change aspect selecting unit (102) for selecting any of a plurality of kinds of aspects as an aspect for changing the frame rate by the frame rate changing unit (120), based on a change aspect selection operation by a user may be further included, and the frame rate changing unit (120) may change the frame rate according to the aspect selected by the change aspect selecting unit (102).

According to the invention described in 8), as any of a plurality of kinds of aspect is selected as an aspect for changing the frame rate, based on a change aspect selection operation by a user, and the frame rate is changed according to the selected aspect, the user can set the frame rate to its desired aspect.

9) In one embodiment of the present invention, a change execution control unit (103) for determining whether to execute changing of the frame rate by the frame rate changing unit (120), based on a change necessity/non-necessity selection operation by a user may be further included.

According to the invention described in 9), as whether to execute changing of the frame is determined, based on a change necessity/non-necessity selection operation by a user, the user can desirably set whether to change the frame rate. For example, a user wishing not to decrease the frame rate but to keep the frame rate high can keep the frame rate from decreasing. A user wishing not to increase the frame rate but to reduce power consumption as much as possible can keep the frame rate from increasing.

14) A game control device (10 or 30) or a game system (1) according to one aspect of the present invention includes a determination unit (110) for determining as to the presence or absence of an operation relative to an operating unit (14) while a game is being executed; and a frame rate changing unit (120) for changing the frame rate of the game screen, based on the result of determination by the determination unit (110), while the game is being executed, wherein the frame rate changing unit (120) sets the frame rate lower when no operation is performed relative to the operating means (14) while the game is being executed, compared with a case where an operation is performed relative to the operating means (14).

15) A program according to one aspect of the present invention is a program for causing a computer to function as the game control device (10 or 30) or the game system (1) described in 14).

16) An information storage medium according to one aspect of the present invention is a computer readable information storage medium storing the program described in 15).

17) A control method for the game control device (10 or 30) or the game system (1) according to one aspect of the present invention includes a determination step (S110, S114, S118, S130, S134, S140, S144, S148, S152) of determining as to the presence or absence of an operation relative to an operating unit (14) while a game is being executed; and a frame rate changing step (S112, S132, S136, S142, S154) of changing the frame rate of the game screen, based on the result of determination by the determination unit (110), while the game is being executed, wherein at the frame rate changing step (S132, S154), the frame rate is set lower when no operation is performed relative to the operating unit (14) while the game is being executed, compared with a case where an operation relative to the operating unit (14) is performed.

According to the invention described in 14) to 17), the frame rate of the game screen is changed, based on the result of determination as to the presence or absence of an operation relative to an operating unit, while a game is being executed, and set lower when no operation is performed, compared with a case with an operation performed. Thus, it is possible to reduce the power consumption by setting a low frame rate when no operation is performed, and also to assure smooth change of an image displayed on the game screen when an operation is performed in response to the operation by the user by setting a high frame rate. That is, it is possible to reduce the power consumption by reducing the frame rate while assuring smooth change of an image displayed on the game screen in response to an operation by a user.

18) An information processing system (1) or an information processing device (10 or 30) according to one aspect of the present invention includes a basic value setting unit (101) for setting the basic value of the frame rate of a screen, based on a basic value setting operation by a user; a unit (110 or 120) for obtaining the result of determination as to the presence or absence of an operation relative to an operating unit (14); and a frame rate changing unit (120) for changing the frame rate of the screen, based on the result of determination, wherein the frame rate changing unit (120) sets the frame rate to a value lower than the basic value when no operation relative to the operating unit (14) is performed.

19) A program according to one aspect of the present invention is a program for causing a computer to function as the information processing system (1) or the information processing device (10 or 30) described in 18).

20) An information storage medium according to one aspect of the present invention is a computer readable information storage medium storing the program described in 19).

21) A control method for an information processing system (1) or an information processing device (10 or 30) according to one aspect of the present invention includes a basic value setting step (S102) of setting the basic value of the frame rate of a screen, based on a basic value setting operation by a user; a step (S110, S114, S118, S130, S134, S140, S144, S148, S152) of obtaining the result of determination as to the presence or absence of an operation relative to an operating unit (14); and a frame rate changing step (S112, S132, S136, S142, S154) of changing the frame rate of the screen, based on the result of determination, wherein at the frame rate changing step (S132, S154), the frame rate is set to a value lower than the basic value when no operation relative to the operating unit (14) is performed.

According to the invention described in 18) to 21), the basic value of the frame rate of a screen is set, based on a basic value setting operation by a user, and the frame rate is changed, based on the result of determination as to the presence or absence of an operation relative to the operating unit, such that the frame rate is set to a value lower than the basic value when no operation is performed. Thus, it is possible to reduce the power consumption by setting a value lower than the basic value when no operation is performed, and also to assure change of an image displayed on the game screen with such smoothness as a user wishes by setting the frame rate to the basic value set by the user when an operation is performed. That is, it is possible to reduce the power consumption by decreasing the frame rate, while assuring smooth change of an image displayed on the game screen in response to an operation by a user.

22) An information processing system (1) or an information processing device (10 or 30) according to one aspect of the present invention include a unit (110 or 120) for obtaining the result of determination as to the presence or absence of an operation relative to an operating unit (14); and a frame rate changing unit (120) for changing the frame rate of a screen, based on the result of determination, wherein the frame rate changing unit (120) sets the frame rate lower when no operation relative to the operating unit (14) is performed, compared with a case in which an operation relative to the operating unit (14) is performed.

23) A program according to one aspect of the present invention is a program for causing a computer to function as the information processing system (1) or the information processing device (10 or 30) described in 22).

24) An information storage medium according to one aspect of the present invention is a computer readable information storage medium storing the program described in 23).

25) A control method for an information processing system (1) or an information processing device (10 or 30) according to one aspect of the present invention includes a step (S110, S114, S118, S130, S134, S140, S144, S148, S152) of obtaining the result of determination as to the presence or absence of an operation relative to an operating unit (14); and a frame rate changing step (S112, S132, S136, S142, S154) of changing the frame rate, based on the result of determination, wherein at the frame rate changing step (S132, S154), the frame rate is set lower when no operation relative to the operating unit (14) is performed, compared with a case in which an operation relative to the operating unit (14) is performed.

According to the invention described in 22) to 25), the frame rate of a screen is changed, based on the result of determination as to the presence or absence of an operation relative to an operating unit, such that the frame rate is set lower when no operation is performed, compared with a case with an operation performed. Thus, it is possible to reduce the power consumption by setting a lower basic value when no operation is performed, and also to assure that an image displayed on the screen will change smoothly when an operation is performed in response to the operation, by setting a high frame rate. That is, it is possible to reduce the power consumption by decreasing the frame rate, while assuring smooth change of an image displayed on the screen in response to an operation by a user.

DESCRIPTION OF REFERENCE NUMERALS 1 game system, N network, 10 game terminal, 11 control unit, 12 storage unit, 13 communication unit, 14 operating unit, 15 display unit, 16 sound output unit, 30 server, 31 control unit, 32 storage unit, 33 communication unit, DB database, 100 setting unit, 101 basic value setting unit, 102 change aspect selecting unit, 103 change execution control unit, 110 determination unit, 120 frame rate changing unit, G100 opponent selection image, C101-1, C101-2, C101-3 rival character, G110 match image, A111 user area, A112-1 to A112-6 box, P113 element, A114 hand area, C115-1 to C115-5 game card, A116 opponent area, A117-1 to A117-6 box, P118 element, P119 particles, F finger, G120 setting image, P121, P122 element.

The invention claimed is:

1. A game control device, comprising:
a processor configured to:
set a basic value of a frame rate of a game screen, based on a basic value setting operation by a user;
determine a presence or absence of a user operation while a game is being executed;
change the frame rate of the game screen, based on a result of the determination, while the game is being executed, such that the frame rate is set to a value lower than the basic value when no user operation is performed while the game is being executed;
increase the frame rate to a second value higher than the basic value when the processor determines the presence of a user operation;
wherein after increasing the frame rate to the second value, the processor decreases the frame rate from the second value to the basic value over a predetermined period of time;
wherein the processor increases the frame rate to the second value when the processor determines the presence of a user operation while the frame rate is being decreased from the second value.

2. The game control device according to claim 1, wherein the processor is further configured to:
determine whether a state with no user operation continues for a reference period of time, and
decrease the frame rate to a first value lower than the basic value when the processor determines that the state with no user operation continues for the reference period of time.

3. The game control device according to claim 2, wherein the processor increases the frame rate to the basic value when the processor determines the presence of a user operation, with the frame rate decreased to the first value.

4. The game control device according to claim 1, wherein the processor increases the frame rate to a value higher than the basic value when a situation of the game is a specific situation.

5. The game control device according to claim 1, wherein the processor is further configured to:
select any of a plurality of kinds of aspects as an aspect for changing the frame rate, based on a change aspect selection operation by the user, wherein
the processor changes the frame rate according to the selected aspect.

6. The game control device according to claim 1, wherein the processor is further configured to:
determine whether to change the frame rate, based on a change necessity/non-necessity selection operation by the user.

7. The game control device according to claim 5, wherein the processor is further configured to:
determine whether to change the frame rate, based on a change necessity/non-necessity selection operation by the user.

8. A game system comprising:
a processor configured to:
set a basic value of a frame rate of a game screen, based on a basic value setting operation by a user;
determine the presence or absence of a user operation while a game is being executed;
change the frame rate of the game screen, based on the result of the determination, while the game is being executed, such that the frame rate is set to a value lower than the basic value when no user operation is performed; and
increase the frame rate to a second value higher than the basic value when the processor determines the presence of a user operation;
wherein after increasing the frame rate to the second value, the processor decreases the frame rate from the second value to the basic value over a predetermined period of time;
wherein the processor increases the frame rate to the second value when the processor determines the presence of a user operation while the frame rate is being decreased from the second value.

9. A computer readable non-transitory information storage medium storing a program for causing a computer to:
set a basic value of a frame rate of a game screen, based on a basic value setting operation by a user;
determine a presence or absence of a user operation while a game is being executed;
change the frame rate of the game screen, based on the determination, while the game is being executed, such that the frame rate is set to a value lower than the basic value when no user operation is performed while the game is being executed; and
increase the frame rate to a second value higher than the basic value when the computer determines the presence of a user operation;
wherein after increasing the frame rate to the second value, the processor decreases the frame rate from the second value to the basic value over a predetermined period of time;

increase the frame rate to the second value when the computer determines the presence of a user operation while the frame rate is being decreased from the second value.

\* \* \* \* \*